(12) United States Patent
Waters

(10) Patent No.: US 6,396,535 B1
(45) Date of Patent: May 28, 2002

(54) SITUATION AWARENESS SYSTEM

(75) Inventor: Richard C. Waters, Concord, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/250,956

(22) Filed: Feb. 16, 1999

(51) Int. Cl.[7] .................................................. H04N 7/18
(52) U.S. Cl. ...................................... 348/159; 348/143
(58) Field of Search ............................... 348/143–149, 348/160, 169, 170, 150–159

(56) References Cited

U.S. PATENT DOCUMENTS

| | | | |
|---|---|---|---|
| 5,680,123 A | 10/1997 | Lee | 340/937 |
| 5,768,443 A | 6/1998 | Michael et al. | 382/294 |
| 5,793,420 A | 8/1998 | Schmidt | 348/148 |
| 5,809,161 A | 9/1998 | Auty et al. | 382/104 |
| 5,819,016 A | 10/1998 | Watanabe et al. | 395/119 |
| 5,821,990 A | 10/1998 | Rudt et al. | 348/88 |
| 5,850,352 A | 12/1998 | Moezzi et al. | 364/514 |
| 5,969,755 A * | 10/1999 | Courtney | 348/143 |
| 5,982,420 A * | 11/1999 | Ratz | 348/171 |

* cited by examiner

*Primary Examiner*—Andy Rao
(74) *Attorney, Agent, or Firm*—Dirk Brinkman

(57) ABSTRACT

A situation awareness system includes a plurality of cameras. Each camera acquires a sequence of images of a particular part of an area of interest. There is overlap between the parts so that the system can obtain depth information about objects in the area of interest. An analyzer identifies moving objects in the areas of interest, attributes of the moving objects, and events related to the moving objects. A display device displays the attributed objects and events as annotated graphic elements and alerts.

11 Claims, 3 Drawing Sheets

SITUATION AWARENESS SYSTEM

FIELD OF THE INVENTION

The invention relates generally to a monitoring system rendering a synthetic display derived from multiple cameras mounted at various locations, and more particularly, to alerting a viewer on special situations observed.

BACKGROUND OF THE INVENTION

Video monitoring systems are well known. In the case of vehicles, several types of monitoring systems are in use. Some vehicles, e.g., busses, have cameras mounted so that the driver can view road areas beside or behind the bus. However, there is typically only one camera, and the display merely shows exactly what the camera sees. There is no attempt to analyze the displayed image. These systems simply act as viewing mirrors for hard-to-see areas. Similarly, law enforcement vehicles may capture a historical record of the view from the front window.

Some vehicles, such as computer controlled cars, also include sensors. The sensors detect potentially dangerous situations, such as, closing-up too rapidly on another vehicle. A variety of sensors have been used, for example, sonar, lasers, and microwaves. These systems do not provide a general situation display, rather they merely detect a few dangerous situations.

Radar and sonar systems can produce a situation display, and sometimes do some amount of analysis, for example, as in an air traffic control system. However, radar and sonar systems are not based on video images, but rather on the processing of reflected signals transmitted at specific frequencies.

Several types of surveillance systems are known. Typically, the systems route multiple video streams to a central location. The video streams can be displayed on corresponding monitors. If the number of cameras is greater than the number of display stations, then the system usually displays camera views in sequence, or on operator demand. These type of systems do not perform analysis, nor do these systems merge multiple streams into a single situation display. At most they may tile multiple independent views on a single screen with time and location annotations.

There are also systems that monitor specific places, such as escalators, elevators, toll gates, bank machines, and perimeter fences, in order to determine the occurrence of particular situations. Some of these systems may attempt to analyze the video in order to detect moving objects, for example, to extract a license number. However, these system typically do not combine information from multiple sources, nor do they generate an overall situation display, nor synthesize an image from a different point of view.

SUMMARY OF THE INVENTION

The invention provides a situation awareness system which includes a plurality of cameras. Each camera acquires a sequence of images of overlapping parts of an area of interest. An analyzer merges the sequences of images acquired by the plurality of cameras, and identifies moving objects in the area of interest. A display device displays the merged sequences of images, and information associated with the identified moving objects.

In one aspect of the invention, the optical flow in temporally successive images of a single video stream are analyzed to generate motion fields. Spatially adjacent images of multiple video stream are registered to obtain depth images. The motion fields and depth images are segmented to generate partially attributed data objects. Using an application specific database and analysis, the partially attributed data objects are converted to fully attributed data objects and events which are displayed as annotated graphic elements and alerts. As one feature of the invention, the viewing orientation of the display is independent of the point of view of the cameras.

DETAILED DESCRIPTION OF PREFERRED EMBODIMENTS

System Overview

Figure 1:
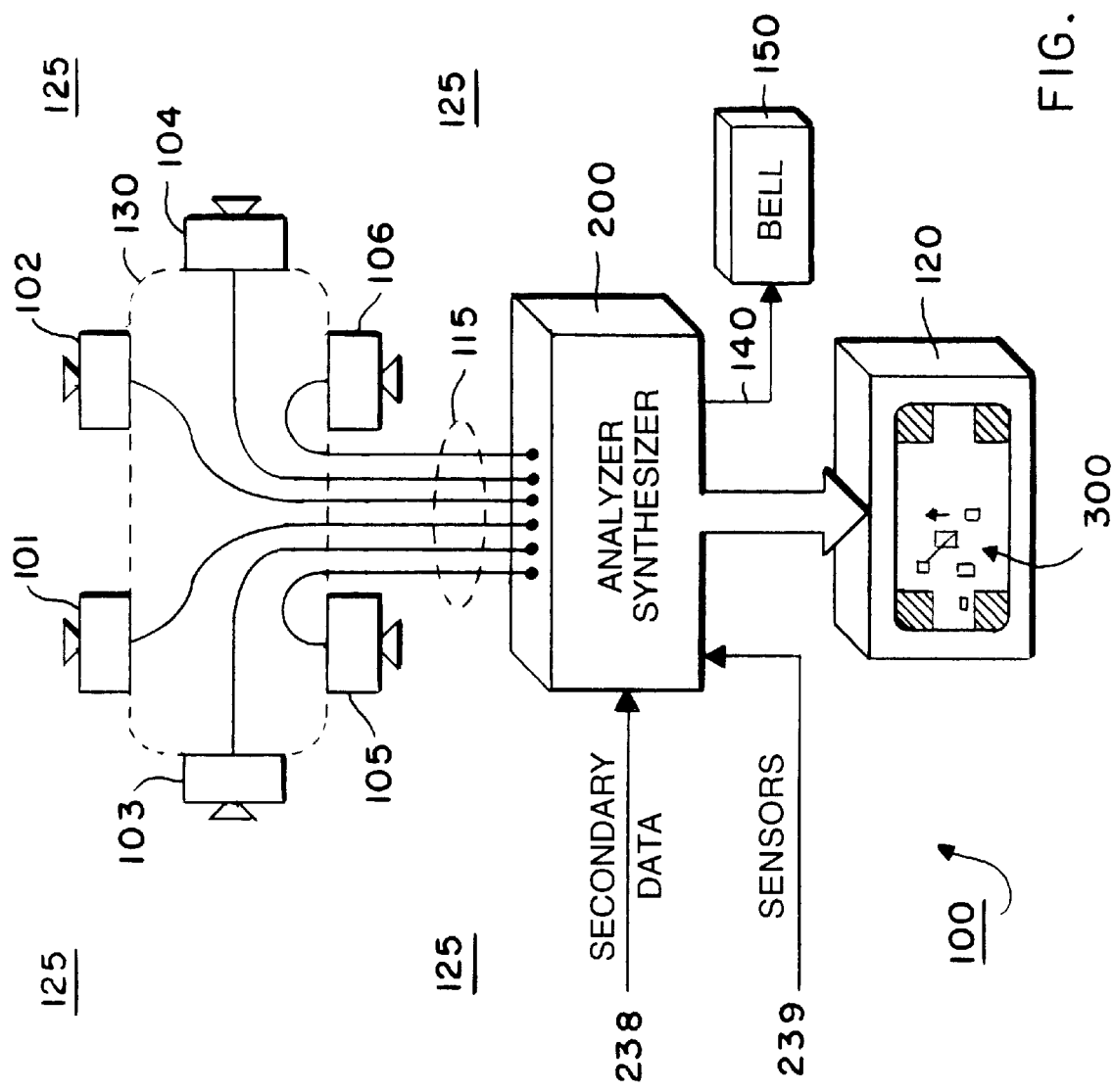
FIG. 1 is a block diagram of an awareness system according to the invention.

FIG. 1 shows the situation awareness system 100 according to my invention. The system 100 includes multiple video cameras 101–106. Each camera acquires a sequence of images as a video stream 115. Six cameras are shown, fewer or more can be used. Additional cameras can be provided for redundancy in the case of a camera failure, or obstruction. The cameras can be arranged to obtain a full 360 degree field of view of an area of interest around a vehicle.

For other applications, a smaller field of view is suitable. The images provided by each camera overlap parts of the area of interest such that stereoscopic techniques can be used to extract depth information. Wide angle lenses can be used to increase the amount of overlap without increasing the number of cameras.

The output of the cameras, digitized video streams 115, is connected to an analyzer-synthesizer 200. The analyzer-synthesizer 200, according to my invention, analyzes the video streams and generates a synthetic display 300 on an output device 120.

System Operation

In an operational system, the cameras can be mounted on, for example, a vehicle 130 shown by dashed lines in FIG. 1. The cameras can also be placed at other fixed or moving locations to observe the area of interest, generally 125, the areas in front of the various lenses.

The analyzer-synthesizer 200 operates on the data of the multiple video streams in real-time. The analyzer portion extracts temporal and spatial data from the video streams to identify objects, and their attributes, such as size, position, and velocity. In addition, relationships between the identified objects are determined, for example, two vehicles on intersecting courses. In other words the video streams are reduced to a relationship of attributed objects. The attributed objects are analyzed to detect events, for example, a possible collision, or a danger zone. The synthesizer portion generates the situation awareness display 300 of the relationships of the attributed objects, and optional alerts related to the events.

According to my invention, the situation awareness display 300 is entirely synthetic. In contrast with the prior art, I discard the video stream 115 after it is analyzed. In addition, the synthesizer integrates information extracted from the multiple video streams into a single display 300. Furthermore, alert signals 140 may be generated when certain dangerous situations or events are recognized. The alert signals can be displayed, or presented to some other output device 150. In an alternative embodiment, the alert signals 140 can initiate evasive collision avoidance action, for example, braking or slowing down.

Synthesizer-Analyzer

Figure 2:
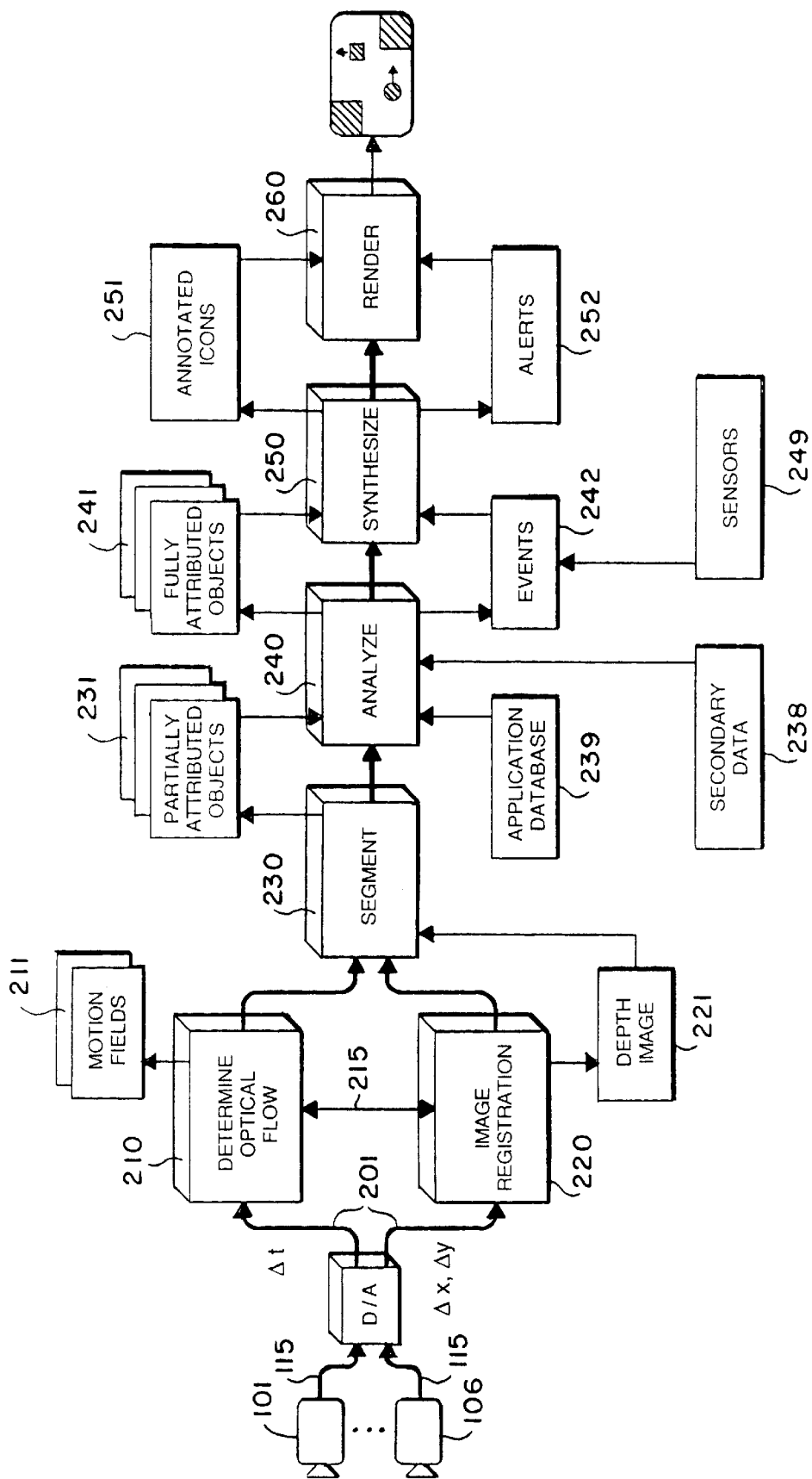
FIG. 2 is a block diagram of an analyzer synthesizer of the system of FIG. 1.

As shown in FIG. 2, video streams 115 from multiple cameras 101–106 are presented to the analyzer/synthesizer 200, via an A/D converter if necessary, as digital video data 201. Temporal and spatial information is extracted from the digital video data 201.

Optical flow analysis 210 is used to determine motion fields 211 from images separated in time ($\Delta t$), for example, from motion fields of successive frames in a single video sequence.

Image registration 220 is used to determine a depth image 221 from images overlapping in space ($\Delta x$, $\Delta y$), for example, using frames taken of overlapping parts of the area of interest by multiple cameras. The depth image specifies the distance ($\Delta z$) to each pixel in the image.

The motions fields and depth image are segmented to produce partially attributed data objects 231. For example, pixels having the same optical flow at the same depth are likely to be related to the same object. Using both the optical flow and distances provides for a robust segmentation, particularly when the flow analysis is done concurrently with the registration so the derived results (motion fields and depth values) correlate with each other (215).

The partial attributes can include the size, position, velocity, direction of movement of the objects in three-dimensional space. The objects are only partially attributed because other attributes that depend on additional knowledge, such as the exact identity of the objects have not yet been determined.

The partially attributed data objects 231, in conjunction with an application specific database 239 can be analyzed 240 to generate fully attributed data objects 241 and events 242. For example, a one-sided view of a semi-trailer is sufficient to deduce the entire shape of the object. Various kinds of template matching schemes can be used to fully identify specific commonly occurring objects, such as, other vehicles, pedestrians, bicycles, trucks, and the like. In a vehicle application, the features may also include lane dividers, side walks, stop signs, guard rails, curbs, buildings, fences, and so forth.

The events 242 can be generated by analyzing the relationships among the attributed objects, for example, a potential collision situation, a car drifting off the road, or a fading light situation. Additional sensors 249 can also be used to enrich the number of events that can be detected.

A synthesizer 250 converts the fully attributed data objects 241 to annotated graphic elements 251 and alerts 252. The last step renders 260 the graphic elements 251 and alerts 252.

Display

Figure 3:
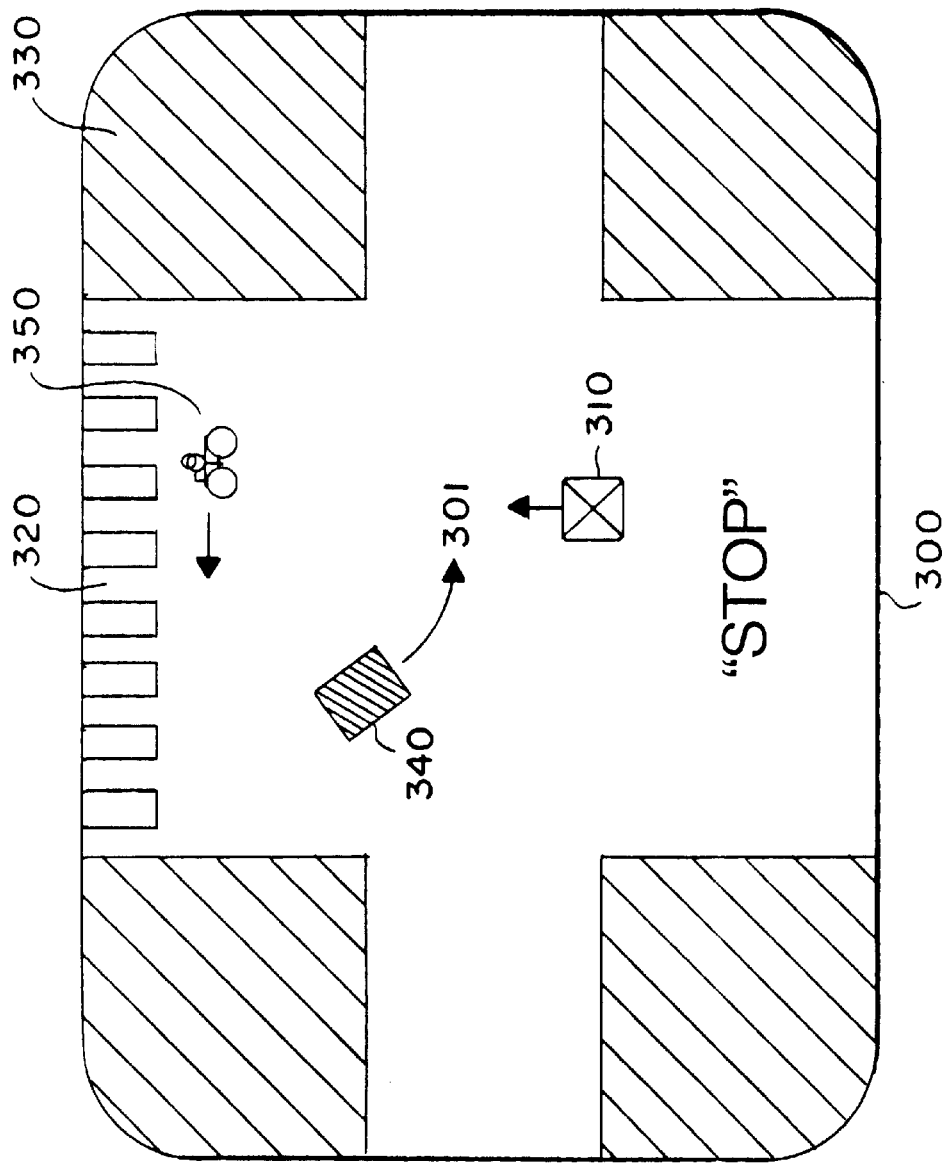
FIG. 3 is an example synthetic image generated by the system of FIG. 1.

Many different types of situation displays are possible. The display 300 in FIG. 3 shows a bird's eye view of the area of interest with the vehicle 310 on which the situation awareness device is mounted, located at a fixed orientation near the center of the display, and annotated objects moving relative to the point of view. Note, the view is totally synthetic and orthogonal to the view seen by the cameras.

Certain other image features are shown as well, such as pedestrian lane crossing 320, buildings 330, other traffic 340, a bicycle 350, and so forth.

Arrows 301 can be used to show the direction of movement of objects that are not stationary. Determining the orientation of the arrows requires an active analysis, as opposed to passively displaying the output of the cameras as done in the prior art.

In an area of interest where sufficient ambient light can not be assured, my invention can be extended by including active illumination. In some situations it could benefit from using infrared light, either to see in the dark without requiring active illumination or as inoffensive active illumination. In situations such as fog, where visibility is poor, my invention can operate by carefully selected wavelengths or strobed light sources appropriately synchronized with the shutter of the cameras so as to focus on objects of interest and reject other scattered light.

In one embodiment of my invention, the analyzing step 240 can receive secondary data 238. In a vehicle application, the data can include vehicle velocity, or position as obtained from a GPS receiver. With the vehicle's velocity, the analysis can be improved and simplified. Positional data enables the use of maps on the display, and actual street and place names.

In another embodiment, the display 300 is under user control. For instance, in a building surveillance application, the user supply control signals 239 to alter the way that the annotated graphic elements and alerts are displayed, or to change the orientation of the point of view. It is also possible to transmit the alerts and graphic elements to a remote location. For instance, while walking toward a parked vehicle, the operator can view, on a portable display device, the area of interest in the vicinity of the vehicle from a safe, location.

In addition, multiple vehicles can exchange situation information with each other to enhance the scope of the display. Other areas where the invention can be used include airports, waterways, and the like.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A real-time situation awareness system, comprising:
   a plurality of cameras acquiring a plurality of video streams of overlapping parts of an area of interest;
   analyzer means for reducing the plurality of video streams to attributed data objects and events using template matching;
   means for discarding the plurality of video streams after reducing the plurality of video streams to attributed data objects and events; and
   synthesizer means for rendering the attributed data objects and events as annotated graphic elements and alerts representative of the area of interest on an output device.

2. The system of claim 1 further comprising:
   means for temporally analyzing an optical flow in successive images of a single video stream to generate motion fields;
   means for spatially registering adjacent images of multiple video stream to obtain depth images; and
   means for segmenting the motion fields and depth images to generate partially attributed data objects.

3. The system of claim 2 further comprising:
   means for analyzing the partially attributed data objects using an application specific database to generate fully attributed data objects and events.

4. The system of claim 3 further comprising:
   sensors providing the analyzing step with secondary data and signals.

5. The system of claim 1 wherein the synthesizer means produces a display having a point of view substantially orthogonal to the point of view of the cameras.

6. The system of claim 1 wherein the area of interest is a panoramic scene.

7. The system of claim 1 wherein annotations for the graphic elements include directions of movement.

8. The system of claim 5 wherein user control signals determine an orientation of the point of view of the display.

9. A method for generating a real-time situation awareness display, comprising the steps of:

acquiring a plurality of video streams of overlapping parts of an area of interest;

reducing the plurality of video streams to attributed data objects and events using template matching;

discarding the plurality of video streams after reducing the plurality of video streams to attributed data objects and events; and rendering the attributed data objects and events as annotated graphic elements and alerts representative of the area of interest on an output device.

10. The method of claim 9 further comprising:

temporally analyzing an optical flow in successive images of a single video stream to generate motion fields;

spatially registering adjacent images of multiple video stream to obtain depth images; and segmenting the motion fields and depth images to generate partially attributed data objects.

11. The method of claim 10 further comprising:

analyzing the partially attributed data objects using an application specific database to generate fully attributed data objects and event.

* * * * *